July 26, 1966

G. E. MOUL, JR 3,262,321

TWO-ROD SEEKER HEAD

Filed Sept. 16, 1963

GEORGE E. MOUL, Jr.
INVENTOR

BY Claude Funkhouser
ATTORNEY

July 26, 1966

G. E. MOUL, JR 3,262,321

TWO-ROD SEEKER HEAD

Filed Sept. 16, 1963

GEORGE E. MOUL, Jr.
INVENTOR

BY Claude Funkhouser

ATTORNEY

July 26, 1966  G. E. MOUL, JR  3,262,321
TWO-ROD SEEKER HEAD
Filed Sept. 16, 1963  5 Sheets-Sheet 3

GEORGE E. MOUL, Jr.
INVENTOR

Claude Funkhouser
ATTORNEY

July 26, 1966 G. E. MOUL, JR 3,262,321
TWO-ROD SEEKER HEAD

Filed Sept. 16, 1963

GEORGE E. MOUL, Jr.
INVENTOR

BY Claude Funkhouser
ATTORNEY

July 26, 1966

G. E. MOUL, JR 3,262,321

TWO-ROD SEEKER HEAD

Filed Sept. 16, 1963

GEORGE E. MOUL, Jr.
INVENTOR

BY Claude Funkhouser
ATTORNEY

United States Patent Office 3,262,321
Patented July 26, 1966

3,262,321
TWO-ROD SEEKER HEAD
George E. Moul, Jr., Silver Spring, Md., assignor to the United States of America as represented by the Secretary of the Navy
Filed Sept. 16, 1963, Ser. No. 309,359
6 Claims. (Cl. 74—1)

This invention relates generally to radar antenna positioning devices, and more particularly to an improved antenna positioning device utilizing a single pair of push rods arranged to move an antenna element through a wide angular range.

Airborne radars employing movable antenna elements have found use in normal aircraft as well as in guided missiles. In the latter, however, the available housing space for the radar apparatus is usually quite limited, and the allowable weight allotments for the apparatus are at a minimum. It is, therefore, highly desirable that antenna apparatus for guided missiles be as light in weight and as compact as is possible.

In guided missiles of the type to which this invention is most pertinent the radar must be capable of searching within the missile's operational envelope until a target is acquired, and must thereafter remain aimed at the target until intercept has been accomplished. Accordingly, the device employed to move the antenna element must be capable of positioning an imaginary line projecting normally from the center of the antenna element universally within the missile's operational envelope. Moreover, the device must be provided with means for precisely and continuously measuring the position of said line, which commonly is called the line of sight, relative to the missile longitudinal axis and flight path, so that necessary corrections in the course of the missile can be made.

It is, therefore, an object of this invention to provide an antenna positioning device so constructed as to be capable of precisely positioning an antenna element over a wide angular range.

It is another object of the invention to provide an antenna positioning device so designed and constructed as to be light in weight and relatively compact in size.

Another object of this invention is to provide an antenna positioning device employing a pair of push rods which are each movable in but a single plane, and which are so connected and arranged as to position an antenna element to any of several angular positions.

A further object of the invention is to provide an antenna positioning device having means thereon so constructed as to continuously measure the position of an antenna element relative to a missile upon which the device is mounted.

Still another object of this invention is to provide an antenna positioning device for use in guided missiles and so constructed as to be capable of withstanding severe inflight shocks and stresses without substantially affecting the accuracy of the antenna element connected thereto.

Other objects and many of the attendant advantages of this invention will be readily appreciated as the same becomes better understood by reference to the following detailed description when considered in connection with the accompanying drawings, wherein.

The antenna positioning device of the instant invention is intended for mounting on the forward bulkhead of a guided missile within the radome thereof, and includes a supporting base upon which are pivotally attached a pair of push rods. The push rods are each movable in a single plane, the plane of movement of one rod being displaced 90 degrees from the plane of movement of the other rod. The rods are each driven by an electric motor and gear reduction unit operating through a lever arm, a pair of linear potentiomters being mounted on the supporting base and being so arranged as to precisely measure the positions of the two lever arms. One push rod is pivotally attached to a cross bar which, in turn, is pivotally attached at its opposite ends to the rear face of the antenna element and medially thereof to the supporting post on the base. The other rod is attached through a universal coupling to a swivel plate which is itself attached to the rear of the antenna at its center poistion. The cross bar and the swivel plate each have a rate gyro associated therewith for detecting rotational changes in position of the two planes in which the push rods move. The push rods are actuated by their respective driving motors to thereby position the antenna element wherever desired within its operating range.

Figure 1:
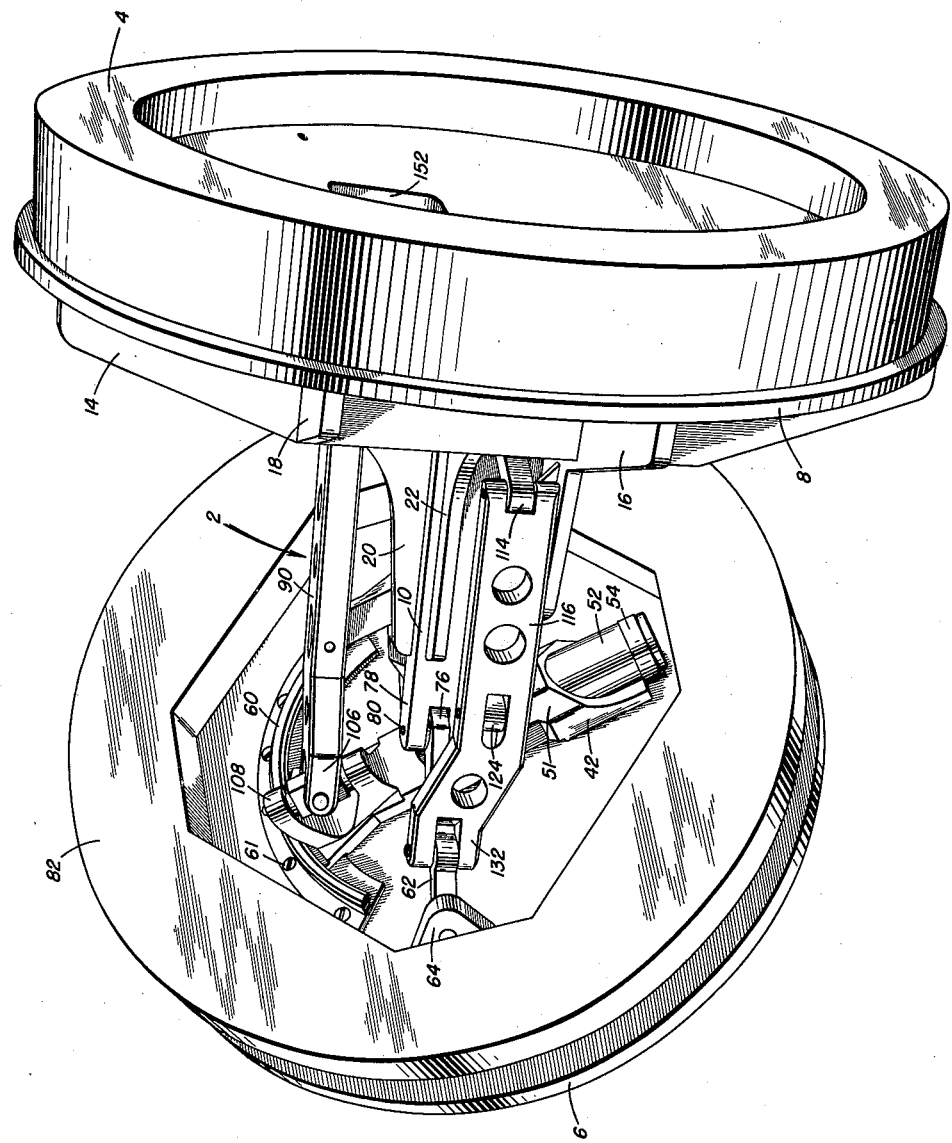
FIG. 1 is a rear perspective of the antenna positioning device, showing in particular the manner in which the two push rods are connected to the rear face of the antenna element.

Referring now to the drawings, an antenna positioning device 2 is shown in FIG. 1 to be attached to a bulkhead 4, and has attached thereto a flat, round antenna element 6. It is to be understood that any of several known antenna elements might be employed without departing from the invention. The bulkhead 4 would normally be a structural member of an airframe, but for purposes of clarity the remainder of the airframe is not illustrated.

Figure 3:
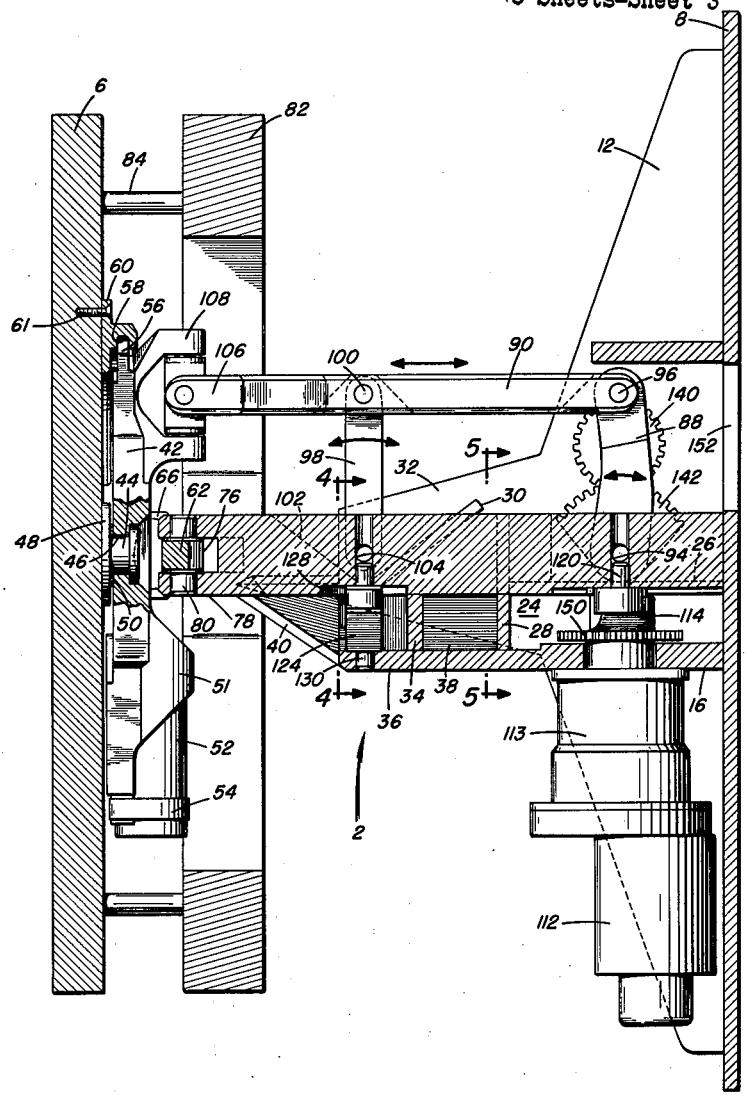
FIG. 3 is a vertical section taken through the center of the positioning device, and showing in elevation the vertical push rod and the structure by which it is connected to the antenna element, the antenna element being shown in a neutral position.
Figure 4:
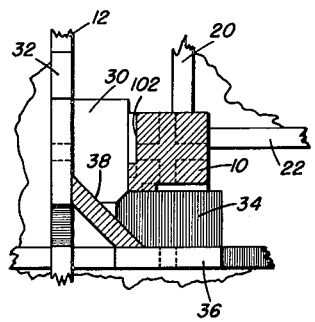
FIG. 4 is a detail section, taken at 4—4 in FIG. 3, showing the construction of the supporting post, the idler arms being removed for clarity.
Figure 5:
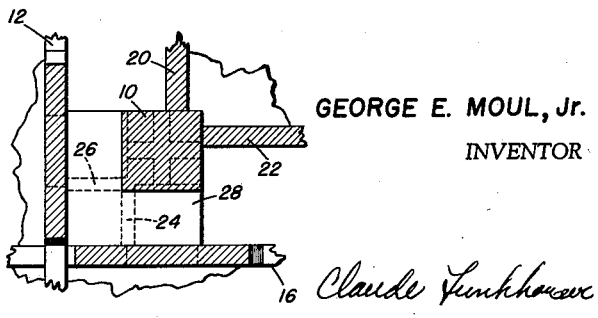
FIG. 5 is a section taken at 5—5 in FIG. 3, and further showing the construction of the supporting post.

The device 2 includes a supporting frame comprising a base plate 8 (FIG. 2) and a center post 10. The plate 8 has a pair of spaced, parallel ribs 12 and 14 extending vertically thereof, and a similar pair of horizontally extending ribs 16 and 18, the four ribs being welded to the base plate. The center post 10 is rectangular, and is positioned with one end in abutment with plate 8 and with the center line thereof lying on a line projecting normally from the center of said plate. The post is secured in position by a plurality of welded in place plates, principal support being provided by a pair of gusset plates 20 and 22, and by a pair of rectangular bracing plates 24 and 26 welded to the ribs 16 and 12, respectively (the plate 24 being shown in full in FIG. 3 and by broken lines in FIG. 5, and the plate 26 being shown by broken lines in both of said FIGS. 3 and 5). The post is further secured by an L-shaped, transverse plate 28 (FIGS. 3 and 5) which is welded to the post, plates 24 and 26, and ribs 12 and 16. An obliquely extending plate 30 is welded in position between the post 10 and an integral, outwardly extending portion 32 of the rib 12, and a similar obliquely extending plate 34 is welded between the bottom of the post 10 and an integral, outwardly extending portion 36 of the horizontal rib 16 (FIGS. 3 and 4). A longitudinally extending plate 38 (FIGS. 3 and 4) having chamfered edges thereon, is oriented at an angle to projections 32 and 36, and is welded to said projections, plate 28, and the forward edges of oblique plates 30 and 34. A triangular bracing plate 40 (FIGS. 3 and 6) is welded at its bottom edge to the plate 38, to the forward ends of the projections 32 and 36, and at its tip to the post 10, and serves to further brace the post against undesired flexure.

The antenna element 6 has an elongated swivel plate 42 (FIGS. 1 and 3) secured thereto by a stud bolt 44, the latter being positioned at the center of the element. The swivel plate has a countersunk bore 46 therein for receiving the stud bolt 44. A spacing washer 48 and a lubricating washer 50 of a material such as Teflon are positioned between the swivel plate and the antenna element. The lower end of the swivel plate has a sleeve 51 thereon for receiving a rate gyro 52, the gyro being secured in position by a band clamp 54.

The upper end of the swivel plate 42 has a lip 56 thereon, which is received within an inwardly facing arcuate channel 58 in an arcuate guide 60, said guide being secured by screws 61 to the antenna element 6. The radius of curvature of the arcuate guide corresponds to the radial length of the upper portion of the swivel plate 42, and the fit between the channel 58 and lip 56 is quite close. Thus, the guide 60 serves to anchor the swivel plate against undesirable deflections during swivel motion of the latter.

Figure 7:
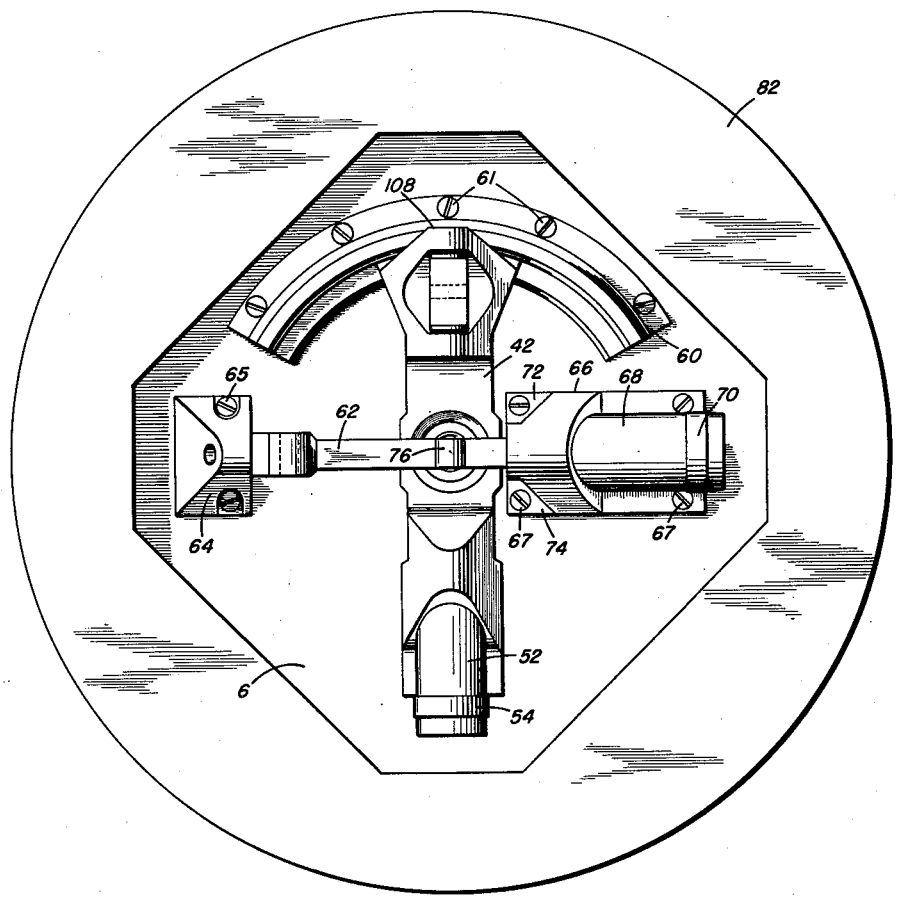
FIG. 7 is a plan view of the rear face of the antenna element, showing in detail the linkage elements attached thereto.

The antenna element 6 also has a cross bar 62 (FIGS. 2, 3 and 7) attached thereto, the ends of said bar being received in a pair of pillow blocks 64 and 66 which are themselves secured by screws 65 and 67, respectively, to the antenna element. The pillow blocks project sufficiently from the surface of the antenna to permit the cross bar 62 to pass with a clearance over the swivel plate 42. The bearing portion of pillow block 66 is disposed close to the swivel plate 42, and the end of said block opposite the cross bar 62 has a sleeve 69 thereon for receiving a second rate gyro 68, said gyro being secured by a band clamp 70. The edges of the pillow block 66 which face swivel plate 42 are cut down at 72 and 74 to a thickness corresponding to that of the washer 48, whereby to permit the plate 42 to move thereover during swivel movement of said plate.

The cross bar 62 has a boss 76 thereon at the middle of the antenna element 6, through which boss a vertical bore extends. The boss-carrying portion of the cross bar 62 is received within the bifurcated end 78 of the post 10, where it is pivotally secured by a pin 80; the antenna 6 is thus mounted for pivotal movement in the vertical plane about the central axis of cross bar 62, and for pivotal movement in the horizontal plane about pin 80.

It is desirable to have the antenna element balanced about its pivotal axes, whereby it is easily moved. A counterweight 82 is therefore attached to the back face of the antenna 6 by a plurality of posts 84, the ends of which posts are threadedly secured to said antenna element and said counterweight. The counterweight is of such a mass and is so positioned by the posts 84 as to balance the antenna about both its pivotal axes.

The antenna 6 is moved in a vertical plane about the cross bar 62 by an electric motor 86 (FIGS. 2 and 6) which acts upon the antenna through a lever arm 88 and a push rod 90 (FIG. 3). The motor 86 includes a suitable speed reducing apparatus 87 and is secured to the rib 12 by a plurality of cap screws 92. The output shaft 94 (FIG. 3) of the motor 86 projects through an opening in the rib 12, and is journaled in a bore in the post 10. The lower end of the lever arm 88 is received in the space defined by rib 12, post 10 and plate 26, and is fixedly attached to the shaft 94. The upper end of lever arm 88 is pivotally attached to the bifurcated rear end of the push rod 90 by a pin 96.

The push rod 90 is supported near its midpoint by an idler arm 98 (FIG. 3), the upper end of said arm being received within a slot in the push rod where it is pivotally secured by a pin 100. The post 10 has a triangular cutout 102 therein, and the lower end of the idler arm is received partially within said cutout and partially within the space defined by the post 10, the extension 32 on the rib 12, and the oblique plate 30. The idler arm is secured in position at its lower end by a pin 104, which is received within aligned bores in extension 32 and the post 10.

The lever arm 88 and the idler arm 98 are of such a length that the distance between the shaft 94 and the pin 96 is identical to the distance between the pins 100 and 104. Thus, the push rod 90 is constantly maintained in a position parallel to the central axis of the post 10, and is free to move in only one plane.

The forward end of the push rod 90 is bifurcated to form a yoke 106, and said rod has a reverse bend therein (FIG. 2) between said yoke and the idler arm 98 whereby the yoke 106 lies directly above the central axis of the post 10. Swivel plate 42 has an integral yoke 108 projecting therefrom at its upper end, the two yokes 106 and 108 being connected in the known manner by a cruciform coupling member 110 to form a universal joint. Thus, movement of lever arm 88 will cause the antenna 6 to move, or tilt, in a vertical plane about the axis of cross bar 62.

Figure 6:
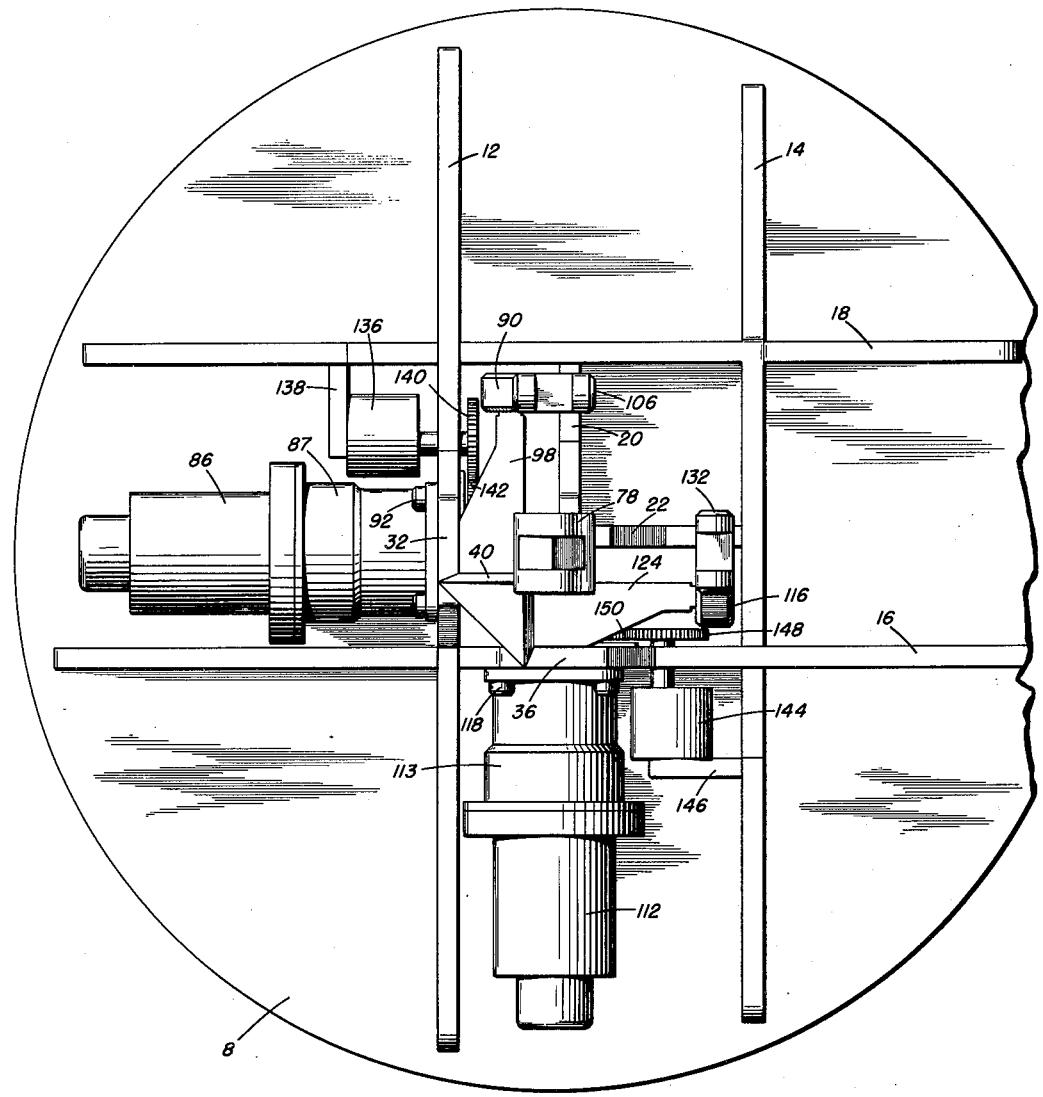
FIG. 6 is a plan view of the supporting base with the antenna element and its attached members removed, and showing in particular the driving motors, the linear potentiometers, the supporting post structure, and the push rods.

Movement of the antenna element in the horizontal plane about the pin 80 is produced by an electric motor 112 through a suitable speed reducing apparatus 113, which acts through a lever arm 114 (FIG. 2) upon a push rod 116. The motor 112 is similar to the motor 86 and is secured to the rib 16 by a plurality of cap screws 118 (FIG. 6). The shaft 120 (FIG. 3) of the motor 112 projects through an opening in the rib 16, and is journaled in a bore in post 10, the lever arm 114 being rigidly attached at its inner end to said shaft. The inner end of the lever arm 114 is received in the space defined by rib 16, post 10, and plate 24.

Figure 2:
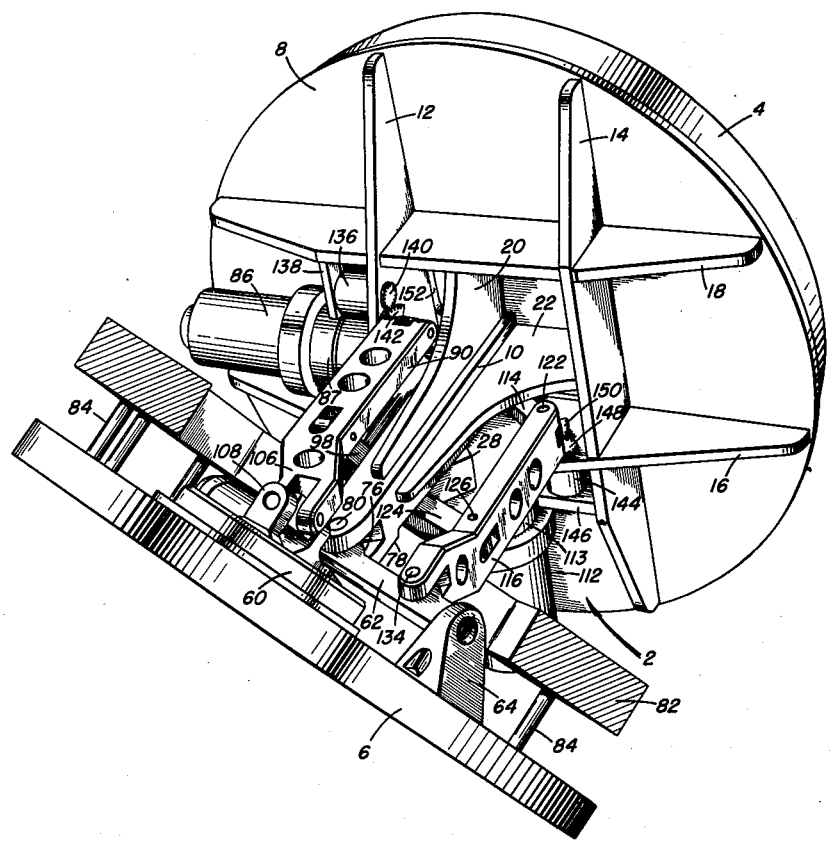
FIG. 2 is a front perspective, generally looking down upon the device, showing the manner in which the push rods are mounted upon the supporting base structure, the counter-weight attached to the antenna element being partially removed for clarity.

The rear end of the push rod 116 is bifurcated, and is pivotally connected with the outer end of the lever arm 114 by a pin 122 (FIG. 2). An idler arm 124, similar in construction and purpose to the idler arm 98, is secured at its outer end within a slot in the push rod 116 by a pin 126; the inner end of said arm is disposed within a space defined by a triangular cutout 128 in post 10, extension 36 on rib 16, and plate 34, and is secured by a pin 130 (FIG. 3), the pin 130 being received within aligned bores in extension 36 and post 10. The idler arm 98 and the lever arm 88 are disposed in a plane which is at a 90 degree angle to the plane containing the idler arm 124 and the lever arm 114.

The forward end of the push rod 116 is bifurcated to form a yoke 132, the rod having a reverse bend therein between said yoke and the idler arm 124 whereby to align the yoke with cross bar 62. The yoke 132 (FIG. 1) is connected to the cross bar by a pivot pin 134 (FIG. 2) which passes through aligned openings in said yoke and said cross bar. Thus, actuation of lever arm 114 produces pivoting motion of the antenna element 6 in the horizontal plane about vertical pivot pin 80.

It will be readily seen how the antenna element 6 may be pivoted in the vertical plane about cross bar 62 by movement of push rod 90. Similarly, it is obvious that movement in the horizontal plane about pin 80 is produced by actuation of push rod 116. It should be noted that each lever arm is connected to the antenna element so as to pivot about two mutually perpendicular axes, one parallel to one axis of pivot of the antenna element and the other coincidental with an axis of pivot of the antenna element when in its neutral position.

The line of sight of the antenna element 6, which was defined hereinabove as a line extending normally from the center of the antenna, may be made to point in any given direction within an operational cone defined by revolving said line about the center line of the post 10 when the antenna element 6 is fully tilted in either the horizontal or the vertical plane; thus, the only limit upon positioning the line of sight is that imposed by the maximum degree of tilt in the horizontal and vertical planes obtainable from the mechanical linkages associated with the push rods 90 and 116. The manner in which the invention functions to move the antenna plate 6 in a compound manner, i.e., in both the horizontal plane (about pin 80) and the vertical plane (about cross bar 62) will now be described. It is, of course, obvious that such compound movement of the antenna element is necessary to obtain universal positioning of the element's line of sight within its operational cone.

The manner of obtaining compound movement will be described with respect to FIGS. 1 and 3; in FIG. 1 the antenna element 6 is facing downwardly and to the right from the neutral position shown in FIG. 3. To move the antenna from the neutral position of FIG. 3 to the compound position of FIG. 1 the antenna is first tilted downwardly about bar 62 by actuating motor 86 in such a manner as to move the push rod 90 forwardly to the left in FIG. 3; when the desired downwardly-facing position is attained, motor 86 ceases operation. The motor 112 is then actuated to move push rod 116 forwardly.

As the push rod 116 moves forward, with the antenna 6 in a depressed position, the swivel plate 42 must move relative to the antenna element, or binding will occur which will prevent movement about pin 80. This freedom of movement is allowed by the manner in which the swivel plate is secured to the antenna, i.e., the stud bolt 44 and the flat, arcuate guide plate 60. Thus, as push rod 116 moves forward the depressed antenna element 6 shifts, or swivels, relative to the plate 42 until the desired direction for the antenna's line of sight is attained.

While in this description of the operation of the invention the push rods 90 and 116 are described, for purposes of clarity, as being operated at different times, it is to be understood that normally the rods are actuated simultaneously. In simultaneous operation the swivel plate arrangement functions in the same manner to permit universal adjustment of the antenna's line of sight within its operational cone.

From the hereinabove description, and from an examination of the drawings, it will be obvious that the position of the line of sight is determined by the positions of the two push rods, and that for each combination of push rod positions there is but one position for the line of sight. It thus follows that if the positions of the two push rods are known, the direction in which the antenna points can be readily determined.

Returning now to FIG. 6, a linear potentiometer 136 is secured to a support 138, which support is attached by welding to the plate 8 and the rib 18. The shaft of the potentiometer 136 projects through an opening in the rib 12, and has a gear 140 attached thereto. The lever arm 90 has a gear segment 142 thereon which is arranged to mesh with the gear 140, and which rotates said gear 140 in response to movement of said lever arm. Similarly, a linear potentiometer 144 is attached to a support 146, the latter being secured to the plate 8 and the rib 14. The shaft of the potentiometer 144 projects through an opening in rib 16 and has a gear 148 thereon, which gear meshes with a gear segment 150 on the lever arm 114.

The two linear potentiometers 136 and 144 function to give an electrical signal which corresponds to the positions of the two push rods; hence, the outputs of the potentiometers are a measure of the position of the line of sight of the antenna element 6.

Electrical wires and connections for the antenna element, the motors and the potentiometers have been omitted from the drawings for clarity, it being understood that connections are made in the usual, known manner. In order to provide room for the push rods to move toward their extreme rearward positions it is necessary to provide cutouts, or openings, in the plate 8 immediately behind said push rods. These openings, one of which is shown at 152 in FIGS. 1, 2 and 3, may also be utilized for passing necessary electrical leads through the plate 8 to the rear of the bulkhead 4.

Obviously, many modifications and variations of the present invention are possible in the light of the above teachings. It is therefore to be understood that within the scope of the appended claims the invention may be practiced otherwise than as specifically described.

What is claimed is:
1. A positioning device, comprising
   a base,
   an element pivotally mounted on said base and movable in three dimensions, and
   a pair of actuator means each pivotally connected to said element,
   at least one of said actuator means being slidably connected to said element,
   each actuator means being actuable to move said element in each of three mutually orthogonal planes.
2. The device of claim 1, wherein said element is an antenna.
3. The device of claim 2, and further including
   swivel plate means rotatably secured to said element for receiving a portion of at least one of said actuator means.
4. The device of claim 3, and further including
   and an arcuate guide plate secured to said element and slidably receiving a portion of said swivel plate means.
5. The device of claim 4, wherein
   each of said actuator means has means for maintaining said actuator means parallel to each other at all times.
6. The device of claim 5, wherein
   each of said actuator means has a driving means connected to said maintaining means for driving said actuator means.

References Cited by the Examiner

UNITED STATES PATENTS

| 2,415,157 | 2/1947 | Bedford | 74—1 X |
| 2,551,180 | 5/1951 | Starr et al. | 74—1 X |
| 2,835,892 | 5/1958 | Szekely | 74—1 X |
| 3,107,543 | 10/1965 | Kershner et al. | 74—99 |

FOREIGN PATENTS

| 933,616 | 8/1963 | Great Britain. |

MILTON KAUFMAN, *Primary Examiner.*

BROUGHTON G. DURHAM, *Examiner.*

F. E. BAKER, *Assistant Examiner.*